United States Patent

[11] 3,618,084

[72] Inventors Rudolf Balsiger
Neuenhof;
Kurt Piechocki, Uster, both of Switzerland
[21] Appl. No. 879,799
[22] Filed Nov. 25, 1969
[45] Patented Nov. 2, 1971
[73] Assignee Zellweger Ltd.
Uster, Switzerland
[32] Priority Nov. 25, 1968
[33] Switzerland
[31] 17504

[54] METHOD OF AND AN APPARATUS FOR ELIMINATING MISLEADING DOPPLER SIGNALS IN A DOPPLER RADAR SPEED-MEASURING SYSTEM
20 Claims, 2 Drawing Figs.

[52] U.S. Cl. .................................................. 343/7 A, 343/8

[51] Int. Cl. ........................................................ G01s 9/44
[50] Field of Search ........................................... 343/7 A, 8

[56] References Cited
UNITED STATES PATENTS
3,506,809  4/1970  Pallat ............................. 343/8 X Primary Examiner—T. H. Tubbesing
Attorney—Craig, Antonelli & Hill

ABSTRACT: Method and apparatus for eliminating misleading Doppler signals in a Doppler radar speed-measuring system in which a measured value derived from the doppler frequency is differentiated to detect portions of the Doppler frequency in excess of a given threshold value which varies with the detected speed, and timing means is provided for controlling the period of time of receipt of proper Doppler signals, the time period of control also being varied in accordance with the measured speed.

METHOD OF AND AN APPARATUS FOR ELIMINATING MISLEADING DOPPLER SIGNALS IN A DOPPLER RADAR SPEED-MEASURING SYSTEM

In Doppler radar speed-measuring systems, the level of the Doppler frequency is used as a measure of the speed at which the vehicle causing this Doppler frequency is travelling. There are two fundamentally different arrangements of the radar beam direction relative to the direction in which the vehicles whose speed is to be measured are travelling, each having its own advantages and disadvantages.

In one of the know arrangements, the axis of the radar beam range runs at least substantially parallel to the direction in which the vehicles are travelling. In the other known arrangement, the axis of the radar beam range extends at an acute angle to the direction in which the vehicles are travelling.

One advantage of the system which measures speed with a radar beam directed parallel to the direction of travel is that strong and fairly regular, i.e. constant Doppler signals are produced on account of the usually relatively large surface areas of the vehicle to be measured which are perpendicular to the axis of the radar beam, allowing for the usual wavelengths of a few centimeters.

However, one of the major disadvantages of the system in which the axis of the radar beam is parallel to the direction of travel is that a given vehicle travelling along a straight section of roadway remains in the effective range of the radar beam for an appreciable distance and while it is travelling this distance no other vehicles can be measured by the radar speed-measuring unit. In other words, several vehicles are often simultaneously situated in the effective range of the radar beam, especially where traffic is dense, a factor which raises some doubts as to the reliability of a measurement taken under such circumstances as these on account of indefinite reflection conditions.

In this particular respect, the arrangement of the radar beam at an acute angle to the direction in which the vehicles are travelling is more advantageous. The reason for this is that vehicles passing the radar speed-measuring unit set up at an acute angle relative to the direction in which the vehicles are travelling pass through the effective range of the radar beam, which as a rule is tightly concentrated, considerably more quickly than in the parallel arrangement described above although moving at the same speed as in the preceding case. Accordingly, the speed of each individual vehicle can be individually measured, even in a relatively dense column of traffic. In other words, the spatial resolving power of the speed-measuring system (in the direction of travel) in which the axis of the radar beam extends at an acute angle to the direction of travel is considerably greater than it is in the system where the axis of the radar beam is directed parallel to the direction in which the vehicles are travelling. In the acute angle system, therefore, it is a much rarer occurrence for several vehicles to be simultaneously situated in the range of the radar beam.

In order further to reduce the probability of several vehicles being simultaneously present during Doppler frequency measurement, it is of advantage to keep the measuring time as short as possible. The measuring time selected is equal for example to only a fraction of the time which the vehicle to be measured takes to pass through the effective range of the radar beam.

In cases where speed is measured on the Doppler radar principle, fluctuations periodically occur in the Doppler frequency under ambiguous reflection conditions. Fluctuations of this kind can also occur in the acute angle system, for example in the case of multiple-lane traffic, oncoming traffic and during overtaking.

Fluctuations in the Doppler frequency can also be caused by reflections from vibrating parts of vehicles and from wheel spokes of the vehicle to be measured.

However, one disadvantage of the system in which the radar beam is aligned at an acute angle to the direction in which the vehicles are travelling is that very often the Doppler signals obtained as a result of the reflections are subjected to additional fluctuations. These additional fluctuations are caused by the vibration of the reflection zone on the vehicle being measured and with short measuring times cannot be eliminated by averaging over prolonged periods.

Accordingly, the aforementioned advantage of greater resolving power of the arrangement in which the axis of the radar beam is aligned at an acute angle to the direction of travel, coupled with a short measuring time, can only be utilized in cases where it is possible to overcome its aforementioned disadvantage, namely the uncertainty of the Doppler frequency caused by fluctuations in the Doppler signal attributable to vibration in the reflection zone on the vehicle being measured.

The present invention relates to a method for neutralizing the effect of the aforementioned fluctuations and to an apparatus for carrying out this method. Neutralization is based on the elimination of the redundant, misleading Doppler signals attributable to the aforementioned fluctuations.

Although there is already a method and an associated apparatus for eliminating the aforementioned deficiencies, they are only effective in certain cases, and nobody has as yet found a solution to this problem that is satisfactory in every case that occurs in practice.

A solution that is only satisfactory in certain cases is described for example in U.S. Pat. No. 3,243,807 relating to "A method of and a circuit for eliminating misleading levels in a system for measuring and recording the speeds of vehicles." This method and the associated circuit arrangement solve the aforementioned problem, namely to eliminate the harmful effect of fluctuations in the Doppler signal during its evaluation, satisfactorily only in a relatively narrow speed range.

The solution to the aforementioned problem in accordance with the present invention is based on experience and knowledge gained through detailed analysis of the physical phenomena that actually occur during the development and reception of Doppler signals from vehicles where the axis of the radar beam is aligned at an acute angle to the direction of travel of the vehicles to be measured.

It has been found that in the arrangement just mentioned for generating Doppler signals there are in effect no sufficiently large surfaces perpendicular to the direction of the radar beam available on the vehicle. The reflections observed in spite of this emanate from discrete reflection centers on the surface of the vehicles. These discrete reflection centers occupy a fixed position on the vehicle and move with it through the effective range of the radar beam along an oblique line. As the vehicle travels through the effective range of the radar beam, the successively activated discrete reflection centers of one and the same vehicle are released as a function of time.

These releases occur irregularly due to the particular finish or quality of a given vehicle's surface and are reflected in sudden changes in phase, amplitude and frequency in the Doppler signal obtained. These sudden changes make the Doppler signal ambiguous, i.e. misleading in regard to the level of the speed to be measured.

The invention is based on the elimination of misleading Doppler signals such as these through automatic elimination or suppression of the formation of corresponding speed measurements during the occurrence of the aforementioned sudden changes and also when the receiving level temporarily falls below a predetermined minimum.

Hitherto, as proved in the aforementioned U.S. Pat. No. 3,243,807, measurements have been eliminated without any regard to the speed actually prevailing. In other words, it was only the behavior as a function of time of an analog value derived from the Doppler signal in relation to a fixed tolerance range that was taken into consideration.

However, due to the fact that as already mentioned the speed actually prevailing was not taken into consideration, the fluctuations in the aforementioned analog value occurring at different speeds as a result of the sudden change in phase and frequency referred to above are also strictly evaluated to differing extents in the know process and associated apparatus. As a result of this, however, the criterion for the universal elimination of Doppler signals over the entire speed-measuring range differs in its strictness.

The object of the invention is to eliminate this disadvantage. To achieve this object, the following steps are taken in the apparatus in accordance with the invention:

1. The differential quotient as a function of time of the analog value derived from the Doppler frequency is initially formed.
2. A signal proportional to the value of this differential quotient is applied to a threshold value circuit.
3. The response level of the aforementioned threshold value circuit is varied in dependence upon speed in such a way that a low response level corresponds to low speeds and a high response level to high speeds. If the response level is exceeded, the associated Doppler signal is eliminated.
4. An electrical timing element ensures that it is only Doppler signals of the kind whose analog value of the differential quotient has kept within a speed-dependent tolerance range defined by the response value of the aforementioned threshold value circuit at least for a definite period of time, that are used for actually measuring the speed.
5. The aforementioned precise or definite period of time is selected to be inversely proportionally dependent upon the speed. Accordingly, it always corresponds to the time which the vehicle being measured takes to travel through a section of roadway of predetermined length.

The invention relates to a method of eliminating misleading Doppler signals in a Doppler radar speed-measuring system in which a measured value derived from the Doppler frequency only moves on to the indication state after it has been successfully tested, the differential of the aforementioned measured value as a function of time being formed in a differentiator and used as a criterion for eliminating the associated Doppler signal under any circumstances. The method according to the invention is distinguished by the fact that a tolerance range for the aforementioned time differential which, when exceeded, results in the associated Doppler signal being eliminated, is governed by the aforementioned measured value.

The invention also relates to an apparatus for carrying out this method comprising a differentiator to whose input end the aforementioned measured value is applied, and being distinguished by the fact that is also comprises a threshold value circuit with a variable threshold valve connected to the output end of the the aforementioned differentiator.

An embodiment of the invention is discussed by way of example in the following with reference to the accompanying drawings, wherein:

FIG. 1 shows a circuit diagram of an apparatus according to the invention which should be regarded strictly as an example. A measured value signal derived from the received signal and proportional to the Doppler frequency $f_D$, for example a negative voltage $U_1$, is to be monitored for its behavior as a function of time.

Figure 1:
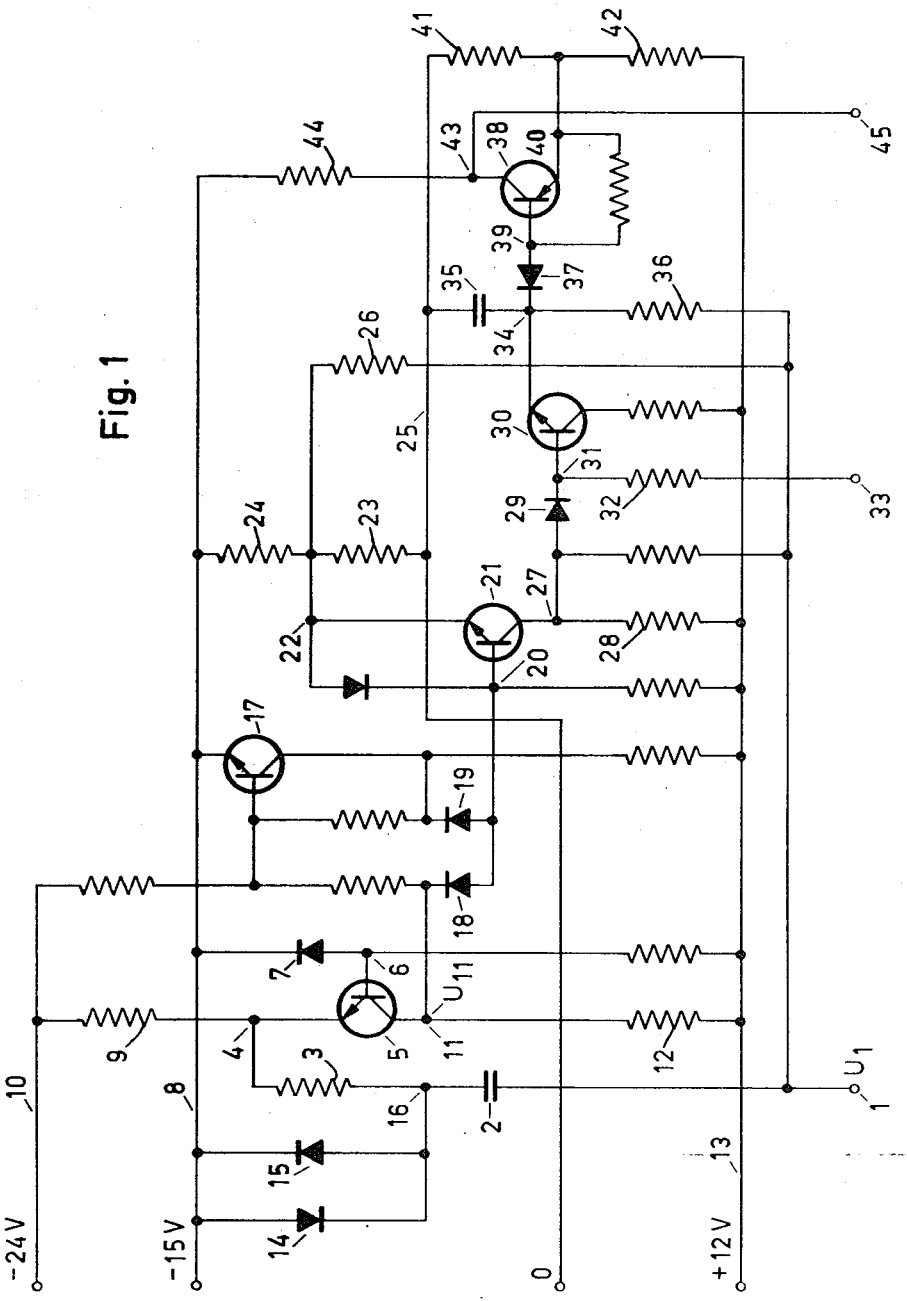
FIG. 1 is a detailed circuit diagram of an apparatus for carrying out the method according to the invention.

The measured value signal $U_1$ is fed into the circuit through an input terminal 1 and a capacitor 1. A current proportional to the change in the measured value signal $U_1$ as a function of time i.e., its time differential, flows to the emitter 4 of a transistor 5 through a relatively small resistance 3 whose influence need not be taken into consideration so far as the following explanation is concerned.

The base 6 of the transistor 5 is connected through a diode 7 to a bus bar 8 on which a fixed potential of −15 volts is provided. The stage with the transistor 5 is connected through a feedback link to the −24-volt bus bar 10 via a relatively high-impedance emitter resistance 9.

When the measured value $U_1$ fluctuates, the current proportional to the changes in time of the measured value $U_1$ coming from the input terminal 1 through the capacitor 2 and the resistance 3, controls the transistor 5 and generates fluctuation voltages at the collector 11 through its collector resistance 12. This stage with the capacitor 2 and the transistor 5 represents a differentiator.

From the bus bar 8 two diodes 14 and 15 are connected in parallel with reverse polarity to the switching point 16. Accordingly, the potential of the switching point 16 is kept substantially within the range of the starting voltages of the diodes 14 and 15 at the value of the potential of the bus bar 8 and represent a limiter for the input signals to the differentiator.

Figure 2:
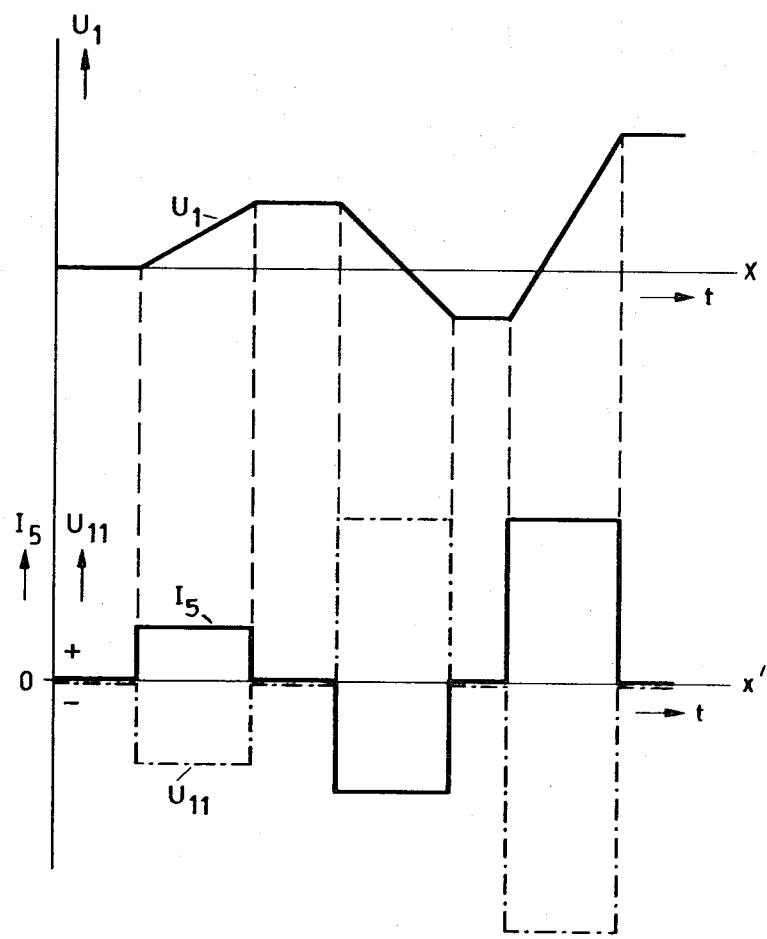
FIG. 2 is a current and voltage graph for the differentiator of the apparatus.

Figure 2 illustrates by way of example the variation of the current $I_5$ in the transistor 5 as a function of time and the variation of the voltage $U_1$ at the collector 11 of the transistor 5 in dependence upon and assumed trend as a function of time of the measured value signal $U_1$ fed to the differentiator, the abscissa axes $x$ and $x'$ corresponding to a rest or inoperative value (i.e. $U_1$=constant) of $U_1$ and of $I_5$ and $U_{11}$.

It can be seen from FIG. 2 that the polarity of the voltage variations at the collector 11, based on the rest or quiescent value of $U_{11}$, are governed by the direction in which the measured value $U_1$ changes. In order equally to acknowledge both positively directed and negatively directed voltage variations of $U_{11}$ in the rest of the circuit, there follows a phase reversal stage with a transistor 17.

Accordingly, a signal of always the same polarity (based on the quiescent value) is delivered to the rest of the circuit, i.e., initially to the switching point 20, through diodes 18 and 19. Accordingly a voltage governed solely by the extent of the variations in the measured value signal $U_1$ occurs at the switching point 20. At the same time, however, very quick but small variations, as caused for example by the residual ripple emanating from the conversion of the Doppler frequency $f_D$ into the analog measured value, are largely eliminated by the RC-section consisting of the capacitor 2 and the resistance 3.

The diodes 18 and 19 are so highly biased by the voltage at switching point 20 as applied from point 22 at the emitter of transistor 21 that it is only variations in $U_{11}$ in excess of a predetermined threshold value that are forwarded to the switching point 20. It must be remembered in this connection that this biasing of the diodes 18 and 19 and hence of the aforementioned threshold value is deliberately made dependent upon the level of the measured value $U_1$.

A threshold value proportionally dependent upon the speed, i.e. also upon the measured value $U_1$ does itself afford a considerable improvement in comparison with conventional systems. One example of a threshold circuit (with the transistor 21) whose threshold value is governed by speed, is shown in FIG. 1 and is described in detail in the following.

The selection of a threshold value in dependence upon $U_1$ has the particularly advantageous effect that in cases where $U_1$ assumes high values (i.e., in the case of high speeds), and due to the then increased biasing of the diodes 18 and 19, a much greater or much quicker fluctuation of $U_1$ is necessary to admissible than is the case where $U_1$ assumes small values (i.e., at low speeds) in order to initiate a control effect upon the part of the circuit following the switching point 20, i.e., initially the threshold value stage with the transistor 21.

It is pointed out that this particularly advantageous effect, and the effect of a timing element to be described further on, constitute what is novel in the present invention.

The aforementioned measures eliminate the disadvantages mentioned earlier affecting conventional methods and apparatus so that it is only by virtue of this threshold value dependent upon the speed or upon $U_1$ that it is possible to operate satisfactorily in a very wide speed range, $v_{min}$ to $v_{max}$.

The circuit selected for the present embodiment for producing the threshold value, governed by $U_1$, of the threshold stage with the transistor 21 is described in the following.

In a switching stage with the transistor 21 whose base is connected to the switching point 20, the switching state or condition, i.e., from which base potential the transistor 21 is conductive or blocked, is governed by the potential at which the emitter point 22 finds itself.

The quiescent potential of the emitter 22, i.e., its potential when the measured value is equal to zero, is derived from voltage division by two resistance 23 and 24 situated between a zero bus bar 25 and the −15-volt bus bar 8, in which connection it should be remembered that in addition another resistance 26 is connected in parallel with the resistance 23 (because when $U_1=0$, the input terminal 1 is at zero potential). When the measured value received differs from zero, the potential at the emitter 22 shifts in the same direction of polarity which the measured value $U_1$ has and hence the threshold value of the switching stage with the transistor 21 also changes in the required direction. The transistor 21 is connected through its collector resistance 28 to a +12-volt bus bar 13.

Detailed analysis of the phenomena involved in reflection has shown that a differential of the aforementioned kind can be made both proportionally and quadratically dependent upon the speed or the measured value $U_1$. Thus, a further improvement is obtained where the aforementioned threshold value is substantially quadratically dependent upon the speed or the measured value $U_1$.

FIG. 1 shows one solution for the proportional dependence of the threshold value. However, if a voltage dependent resistance, for example of the so-called VDR-type, is selected for the resistance 26, for example, the threshold value will be substantially quadratically dependent upon the speed.

If the measured value $U_1$ is subjected to sufficiently strong or rapid variations, the transistor 21 is blocked by the negative voltages occurring at the switching point 20 in this event, i.e., at the base of the transistor 21, too. While the transistor 21 is blocked, the potential at its collector 27 jumps to the potential value +12-volts of the bus bar 13. The jump in potential is delivered from the collector 27 through a diode 29 to an emitter follower stage with a transistor 30 acting as a switching stage. This emitter follower stage transmits this jump in potential to the switching point 34. (The base 31 of this switching stage is connected to a terminal 33 through a resistance 32. The object of this arrangement will be explained later on).

As mentioned earlier, another function of the apparatus is to only release Doppler signals of the kind whose analog value, measured value $U_1$, has been kept within a speed-dependent tolerance range defined by the response level of the aforementioned threshold value circuit, at least for a certain period of time, for actually measuring the speed.

In this respect, the novelty of the invention is embodied in the fact that the aforementioned period is at least substantially inversely proportional to the speed (or measured value $U_1$) measured. Accordingly, this period of time always corresponds to the time taken by the vehicles under observation to travel through a section of roadway always of substantially the same length within the effective range of the radar beam, the length of which section is thus independent of the speed of the vehicle under observation and is made equal to 0.5 meter for example.

Development of the aforementioned variable period of time takes place in the apparatus shown in FIG. 1 in a timing section comprising a capacitor 35 and a resistance 36. This timing section is situated between the emitter follower stage with the transistor 30 acting as switching stage, and another switching stage with the transistor 38. To protect the transistor 38 against inadmissible voltage surges, its base 39 is preceded by a diode 37.

The switching level of the other switching stage, i.e., the potential value of the base 39 of the transistor 38, at which the transistor changes from the conductive state to the blocked state and back again, is determined by the potential of its emitter 40. This emitter potential is fixed as +1 volt for example by a voltage divider made up of the resistances 41 and 42 connected between the zero bus bar 25 and the +12-volt bus bar 13.

The timing section, consisting of the capacitor 35 and the resistance 36 and preceding the rest of the switching stage, determines the potential of the switching point 34 by the state of charging of its capacitor 35.

During strong interruptions in reflection, a jump in potential to +12-volts for example is as already mentioned delivered to the transistor 30 from which it is transferred to the switching point 34. Accordingly, the capacitor 35 is charged to about +12-volts.

If the reflection conditions then return to normal, the variations in the measured value $U_1$ either disappear, or if they remain within the corresponding tolerance range, the switching stage with the transistor 30 changes into the blocked state. The capacitor 35 then discharges via the resistance 36 to the negative potential $U_1$ at terminal 1 emanating from a low-impedance source. The higher the speed of the vehicle under observation, the higher (negatively) the measured value $U_1$ and the more quickly the capacitor 35 will discharge.

During this discharge, the potential of the point 34 drops from +12-volts. When it reaches the switching level of the transistor 38, the transistor 38 becomes conductive and the potential of its collector 43 jumps from its original value −15-volts to about +1-volt. (When the transistor 38 is blocked the value −15-volt is fed to the collector 43 through a resistance 44 connected to the −15-volt bus bar 8). The jump in potential from −15-volt to +15-volt for example is fed as a command signal to an output terminal 45 of the apparatus for evaluating the particular measured value $U_1$ being received.

It should be remembered that marked variations in the measured value $U_1$ occurring only briefly during the discharge of the capacitor 35 are sufficient to initiate full charging of the capacitor 35 through the relatively low-impedance emitter-follower stage with the transistor 30, so that the timing section (capacitor 35, resistance 36) begins to run again.

Instead of the discharge of the capacitor 35 of the timing section, it would also be possible to utilize its charging cycle given at a suitable choice of polarity of the semiconductor elements such as diodes and transistors.

By releasing its evaluation-command signal to the terminal 45, the apparatus described above has performed its function, in other words after a vehicle has passed through the effective range of the radar beam. It is only required again when another vehicle enters the effective range of the radar beam. It has proved to be of advantage temporarily to block the apparatus in the meantime for example by applying a blocking voltage to the terminal 33 mentioned earlier.

Compared with the prior art, the invention is novel, (1) in the choice of a tolerance range, dependent upon the speed or the size of the measured value $U_1$, for the acceptability of the variations in the measured value $U_1$, and (2) in the duration, dependent upon the speed of the vehicle under observation or the size of the value $U_1$, of uninterrupted reflection conditions until the evaluation-command signal for the measured value $U_1$ is released.

While we have shown and described only one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

What we claim is:

1. A method of eliminating misleading Doppler frequency signals in a Doppler radar speed-measuring system in which a measured value derived from the Doppler frequency is passed on to control a speed indication stage only if it is a proper signal comprising
    detecting the time differential of said measured value derived from the Doppler frequency,
    preventing passage of said Doppler frequency signals to said speed indication stage when said time differential exceeds a given tolerance range, and
    varying said tolerance range in accordance with the level of said measured value.

2. A method according to claim 1, wherein said tolerance range is varied proportionally to said measured value.

3. A method according to claim 1, wherein said tolerance range us varied substantially proportionally to the square of said measured value.

4. A method according to claim 1, wherein passage of said Doppler frequency signals to said speed indication stage is prevented where said time differential exceeds said tolerance range at least once within a predetermined time interval.

5. A method according to claim 4, further including the step of varying said predetermined time interval in inverse proportion to said measured value and hence to the speed of the vehicle under observation.

6. An apparatus for eliminating misleading Doppler frequency signals in a Doppler radar speed-measuring system comprising
differentiating means for differentiating a measured value signal derived from the Doppler frequency signals,
threshold circuit means connected to the output of said differentiating means for generating a control signal only in response to the differentiated measured value signal falling within a given tolerance range, said control signal enabling measurement of speed from said Doppler frequency signals,
control means responsive to the level of said measured value signal for varying said tolerance range of said threshold circuit means.

7. An apparatus as claimed in claim 6, wherein said control means includes means for varying said tolerance range in proportion to the level of said measured value signal.

8. An apparatus as claimed in claim 6, wherein said control means includes means for varying said tolerance range in proportion to the square of said measured value.

9. An apparatus as claimed in claim 6, wherein said measured value signal is an analog of said Doppler frequency signals and said differentiating means includes a differentiator receiving said measured value signal at its input and providing a time differential signal at its output.

10. An apparatus as claimed in claim 9, wherein a limiter is connected at the input of said differentiator.

11. An apparatus as claimed in claim 10, wherein a phase reversal stage is connected to the output end of the differentiator.

12. An apparatus as claimed in claim 11, wherein said threshold circuit means includes a switching transistor circuit and diode means connecting said differentiating means to said switching transistor circuit and biased in response to the level of said measured value signal for controlling the conduction of said switching transistor circuit.

13. An apparatus as claimed in claim 12, wherein said limiter, the differentiator, the phase reversal stage, the threshold circuit means with its speed-dependent tolerance range and switching transistor circuit are connected in series.

14. An apparatus as claimed in claim 9, wherein two diodes are connected antiparallel and are connected at one end to a fixed potential and are galvanically connected at another end to an emitter terminal of a transistor in said differentiator.

15. An apparatus as claimed in claim 6, further including timing means responsive to the output of said threshold circuit means for enabling measurement of speed from said Doppler signals only after generation of said control signal continuously for a given period of time.

16. An apparatus as claimed in claim 15, wherein said timing means includes means connected in receipt of said measured value signal for varying said give time period in inverse proportion to the level of said measured value signal.

17. An apparatus as claimed in claim 6, further including a timing circuit including a capacitor and a resistance for discharging the capacitor, one terminal of the capacitor being connected to a source of constant potential and the other terminal being connected to a switching point which is connected to a first switch circuit connected to the output of the threshold circuit means, to the input of a second switch circuit via a diode and to one end of said resistance, to other end of said resistance being galvanically connected to a terminal at said measured value, the output of said second switching means providing a control for passage of said Doppler frequency signals.

18. An apparatus as claimed in claim 9, wherein said threshold circuit means includes a switching transistor circuit and diode means connecting said differentiating means to said switching transistor circuit and biased in response to the level of said measured value signal for controlling the conduction of said switching transistor circuit.

19. An apparatus as defined in claim 18, further including a timing circuit connected to the output of said switching transistor circuit for permitting measurement of the Doppler frequency only after receipt of said control signal at the output of said switching transistor circuit continuously for a given time period.

20. An apparatus as claimed in claim 19, wherein said timing means includes means connected in receipt of said measured value signal for varying said given time period in inverse proportion to the level of said measured value signal.

* * * * *